3,222,400
PROCESS FOR THE PRODUCTION OF N-SECONDARY-ALKYL-ARYLAMINES
Hubert Suter, Guenter Poehler, and Heinrich Sperber, Ludwigshafen (Rhine), Germany, assignors to Badische Anilin- & Soda-Fabrik Aktiengesellschaft, Ludwigshafen (Rhine), Germany
No Drawing. Filed May 21, 1962, Ser. No. 196,474
Claims priority, application Germany, June 8, 1961, B 62,818
5 Claims. (Cl. 260—577)

This invention relates to a process for the production of N-secondary-alkyl-arylamines, i.e., alkylated aromatic amines whose alkyl groups are connected with the nitrogen atom by a secondary carbon atom.

It is known to react aromatic amines with alcohols in the presence of nickel to form secondary amines. It is not possible to carry out the N-alkylation of aromatic amines with secondary alcohols. Thus for example aniline will not react with isopropyl alcohol or secondary butyl alcohol (see Rice and Kohn, "Journal of the American Chemical Society," volume 77 (1955), page 4052).

It is an object of this invention to provide a process for reacting secondary alcohols with aromatic amines. It is another object of the invention to prepare N-secondary-alkyl substituted arylamines in good yields. It is a further object of the invention to provide a process by which the reaction products obtained by catalytic hydrogenation of nitroaryl or nitroaminoaryl compounds can be reacted direct with secondary alcohols.

These objects are achieved by carrying out the reaction at a temperature above 150° C. in the presence of catalysts containing nickel, in the presence or absence of inert gases, under a pressure which is higher than the vapor pressure in the reaction mixture at the reaction temperature of the reaction mixture.

Suitable catalysts are, for example, Raney nickel. The nickel may contain additions of copper and/or manganese as promoters. Copper and/or manganese may also be added in the form of compounds, but are present under the reaction conditions in metallic form. The amount of copper added may be relatively large; for example the molar ratio of copper to nickel may reach 1:1. On the other hand, manganese is active in smaller amounts, for example 0 to 7% by weight with reference to nickel.

Instead of pure metallic catalysts it is advantageous to use carrier catalysts having the same active components. The amount of nickel, and also any promoters present, should be at least 5% by weight of the total catalyst. For reasons of stability, catalysts with 20 to 35% by weight of active components (with reference to the total catalyst) are preferred.

Suitable inert carriers include the known natural or synthetic oxides, oxide mixtures or silicates such as diatomaceous earth, clay or kaolin, bleaching earths, pumice or bauxite, silica gel, aluminum oxide, zinc oxide or thorium oxide or mixtures of these oxidic compounds. Especially good results are achieved with silicic acid (or silica) and with so-called Bayer mass. Bayer mass is obtained by the Bayer process for the production of aluminum oxide and has the following approximate composition:

| | Percent by weight |
|---|---|
| $Fe_2O_3$ | 40 to 50 |
| $Al_2O_3$ | 17 to 25 |
| $SiO_2$ | 2 to 10 |
| $TiO_2$ | 3 to 8 |
| Alkaline earth oxides | 0.2 to 4 |
| Alkali metal oxides | 2 to 5 | the balance to 100% being essentially water.

It has further proved to be advantageous for the catalyst to contain up to 4% by weight of alkali compounds (calculated as oxides) either in the carrier or applied by subsequent impregnation of the catalyst with alkali hydroxide, carbonate or silicate solutions or other alkali compounds.

Catalysts which have internal surfaces of 10 to 200 square meters per gram and mean pore radii of 10 to 150 A. have proved to be very suitable.

The catalysts are used in the conventional way in granulated, tableted or pelleted form.

An especially advantageous catalyst for the alkylation of arylene diamines contains 13 to 18% by weight of nickel, 5 to 15% of copper and 0 to 1% of manganese on silica or Bayer mass.

It is advantageous to use as secondary alkanols those having 3 to 8, especially 4 to 6, carbon atoms in the molecule, for example isopropanol, 2-octanol, but particularly secondary butyl alcohol, secondary-amyl alcohol or mixtures of these alcohols.

Diamines of monocyclic and bicyclic aryl hydrocarbons may be used as aromatic amino compounds, for example o-, m- and p-phenylene diamine, 1,4-diaminonaphthalene and 1,5-diaminonaphthalene. It is advantageous to use these amino compounds in the form in which they are obtained direct after hydrogenation of the corresponding nitro compounds or nitroamino compounds, and it is expedient to carry out the hydrogenation in a solvent consisting of the alcohol serving for the alkylation of the amino compounds. Compounds containing nitro groups which are suitable for this reduction, are for example dinitronaphthalenes, nitroaminonaphthalenes and especially nitroanilines.

The process is especially suitable for the production of N-secondary-alkyl substituted o-, m- and p-phenylenediamines from the corresponding diamino and aminonitro compounds.

The reaction temperature for the alkylation lies between about 150° and 230° C., especially between 150° and about 200° C. The reaction mixture must be present in substantially liquid form during the reaction. The pressure must, therefore, be higher than the vapor pressure exhibited by the compounds used at the reaction temperature in the reaction mixture. When using low molecular weight alcohols, pressures of 2 to 30 atmospheres, for example, may be used. It is recommended to maintain a pressure below 30 atmospheres irrespective of the secondary alcohol used.

In general, a 3 to 30%, especially 4 to 18%, by weight solution of the amine in alcohol is used.

The process may be carried out batchwise or continuously, for example by the trickling method or by passing the reactants into the liquid phase from the bottom and withdrawing the product at the top. It is preferred to trickle a mixture of the secondary alcohol with about 3 to 30% by weight, especially 4 to 18% by weight, of the aromatic amine in the liquid phase under the above-mentioned reaction conditions over a catalyst rigidly arranged in a vertical reaction chamber. The pressure necessary may be achieved by the vapor pressure of the alcohol used. In general, however, pressure is set up by means of an inert gas, such as nitrogen or hydrogen, because in this way side reactions, especially splitting off of water from the alcohol, are lessened at the same time. The reaction product withdrawn from the reaction vessel is separated into gas and liquid in a separator, the liquid decompressed and the gas returned for maintenance of the pressure. The pure N-alkylated arylamine is obtained by distillation of the liquid reaction product.

As already mentioned, the alkylation process may also be carried out by using reaction mixtures which have been obtained by hydrogenation of nitro- or nitroaminoarylenes. In principle, the hydrogenation of these nitro compounds may be carried out under different conditions, but since it is possible to use for the hydrogenation the nickel catalysts specified for the alkylation of the amino compounds, it is especially advantageous to combine the hydrogenation and alkylation by first hydrogenating the compounds containing nitro groups dissolved in the alcohol which is later to be used for the alkylation, and then immediately effecting the alkylation. Since hydrogen is an inert gas for the alkylation reaction, hydrogenation of the nitro groups and alkylation of the amino groups may be carried out in a single reaction vessel by dissolving the compounds containing nitro groups in the secondary alcohol with which the amino compound is to be alkylated, and then passing the solution over the above-defined catalyst. In this way, the diamino compounds formed intermediately by hydrogenation of the nitro compounds are immediately alkylated.

The invention is illustrated by, but not limited to, the following examples.

*Example 1*

A reaction mixture, which has been prepared by dissolving 108 g. (1 gram-mole) of p-phenylenediamine in 1,110 g. (15 gram-moles) of secondary butyl alcohol, is introduced at the rate of 2 liters per hour into the top of a vertical reaction vessel having a length of 1.5 m. and a diameter of 45 mm. The vessel is filled with 2 liters of a granulated catalyst consisting of 15% of nickel, 5% of copper, and 1% of manganese and is supported on silicon dioxide. It has an internal surface of about 50 square meters per gram, a mean pore radius of 81.1 A. and a total pore volume of 0.207 cc./g. The maximum of the pore distribution curve lies at 200 to 700 A. A layer of Raschig rings is placed over the catalyst. The reaction is carried out in the liquid phase. The reaction temperature is 160° to 180° C. and the necessary pressure of 14 atmospheres gage is maintained with nitrogen.

The product leaving at the bottom of the reaction vessel is separated from gas in a separator, discharged and worked up by distillation. Excess secondary butyl alcohol together with the reaction water present is separated as forerun in the distillation. 333 g. per hour of N,N'-di-secondary-butyl-p-phenylenediamine is obtained as the main product at the boiling point 171° to 174° C. at 13 mm. Hg. This is a yield of 92.5% of the theory.

*Example 2*

The apparatus used comprises two reaction vessels of the dimensions described in Example 1 arranged in series. The first reaction vessel is filled with 2 liters of a catalyst consisting of 20% of copper on silica pellets. The second reaction vessel contains a nickel catalyst such as is described in Example 1. A reaction mixture which has been prepared by dissolving 138 g. (1 gram-mole) of p-nitraniline in 1,110 g. (15 gram-moles) of secondary butyl alcohol is supplied to the top of the first reaction vessel. The liquid is supplied at the rate of 4 liters per hour. The reaction temperature in the first reaction vessel is 160° to 180° C. Simultaneously with the solution, the hydrogen required for the hydrogenation is supplied to the top of the vessel at the rate of 1 cubic meter of hydrogen per hour. The working pressure is 14 atmospheres gage. The product obtained at the bottom of the first reaction tube is freed from gas in a low pressure separator. The excess hydrogen is returned. The reaction solution containing p-phenylenediamine and water from the condensation stage is supplied by means of a pump to the top of the second reaction vessel. The same temperature and pressure conditions as in Example 1 are maintained in the second reaction vessel. The hourly supply of solution is 4 liters.

The condensation product obtained at the lower end of the second reaction tube is distilled in the usual way. After distilling off the excess secondary butyl alcohol (the water distils off azeotropically) 115 g. of p-phenylenediamine, 36 g. of N-mono-secondary-butyl-p-phenylenediamine (boiling point 150° to 152° C. at 13 mm. Hg) and 349 g. of N,N'-di-secondary-butyl-p-phenylenediamine (boiling point 171° to 174° C. at 13 mm. Hg) are obtained per hour. In this two-stage process, a conversion of 65% and a yield of 91% of the theory, with reference to p-nitraniline, are achieved by a single passage. Unreacted p-phenylenediamine and also monoalkylated N-secondary-butyl-p-phenylenediamine may be returned to the second stage. The monoalkylated product may also be supplied to the condensation stage.

*Example 3*

A vertical tube having a length of 2 meters and a diameter of 45 mm. is used as the reactor. The volume of catalyst is 3 liters. The catalyst consists of 15% of nickel, 5% of copper and 1% of manganese on silicon dioxide and has a grain size of 3 to 4 mm. A solution of 138 g. (1 gram-mole) of p-nitraniline and 1,480 g. (20 gram-moles) of secondary butyl alcohol is fed to the top of the reactor at an hourly rate of 2 liters. The reaction temperature is 160° C. in the upper third of the reactor and 170° to 180° C. in the lower two-thirds. The pressure n the reaction chamber is kept at 14 atmospheres gage. 400 liters (S.T.P.) of hydrogen is supplied per hour. Hydrogenation to p-phenylenediamine takes place in the upper one-third of the reactor and the mixture is immediately alkylated in the lower two-thirds. After secondary butyl alcohol and water have been separated from the crude product, 234 g. of N,N'-di-secondary-butyl-p-phenylenediamine and 19 g. of residue are obtained per hour. The total yield is 86.5% of the theory with reference to p-nitraniline.

What we claim is:

1. A process for the production of N,N'-di-secondary alkylaryldiamines which comprises reacting a secondary alkanol having 3 to 8 carbon atoms with an aryldiamine with 1 to 2 aromatic rings in the presence of a nickel catalyst containing a promotor selected from the group consisting of copper and mixtures of copper and manganese, the molar ratio of nickel to copper being at least 1:1 and the amount of manganese being from 0 to 7% by weight based on the weight of the nickel, said aryldiamine being reacted in a 3 to 30% by weight solution in said secondary alkanol, said reaction being carried out at a temperature of between about 150° C. and 230° C. and at a pressure higher than the vapor pressure of the reaction mixture at the reaction temperature.

2. A process for the production of a monocyclic N,N'-di-secondary alkylaryldiamine which comprises reacting a secondary alkanol having 3 to 8 carbon atoms with a monocyclic arylenediamine in the presence of a metal catalyst containing 13 to 18% of nickel, 5 to 15% of copper and 0 to 1% of manganese on an inert carrier selected from the group consisting of silica and Bayer mass, the amount of active components being from about 20 to 35% by weight based on the weight of the total catalyst, said arylenediamine being reacted in a 3 to 30% by weight solution in said secondary alkanol said reaction being carried out at a temperature of between about 150° C. and 230° C. and at a pressure higher than the vapor pressure of the reaction mixture at the reaction temperature.

3. A process as claimed in claim 1 wherein a carrier catalyst is used which contains an inert carrier, the percentage by weight of the metals being between 5 and 35, with reference to the catalyst.

4. A process as claimed in claim 3 wherein a carrier is used selected from the group consisting of silica and the oxide mixture of the Bayer mass.

5. A process as claimed in claim 3 wherein a carrier catalyst is used which contains up to 4% by weight, with reference to the carrier catalyst, of an alkali oxide.

References Cited by the Examiner
UNITED STATES PATENTS
2,580,284  12/1951  Deahl et al. _____ 260—577

CHARLES B. PARKER, *Primary Examiner.*